United States Patent Office 2,718,637
Patented Sept. 20, 1955

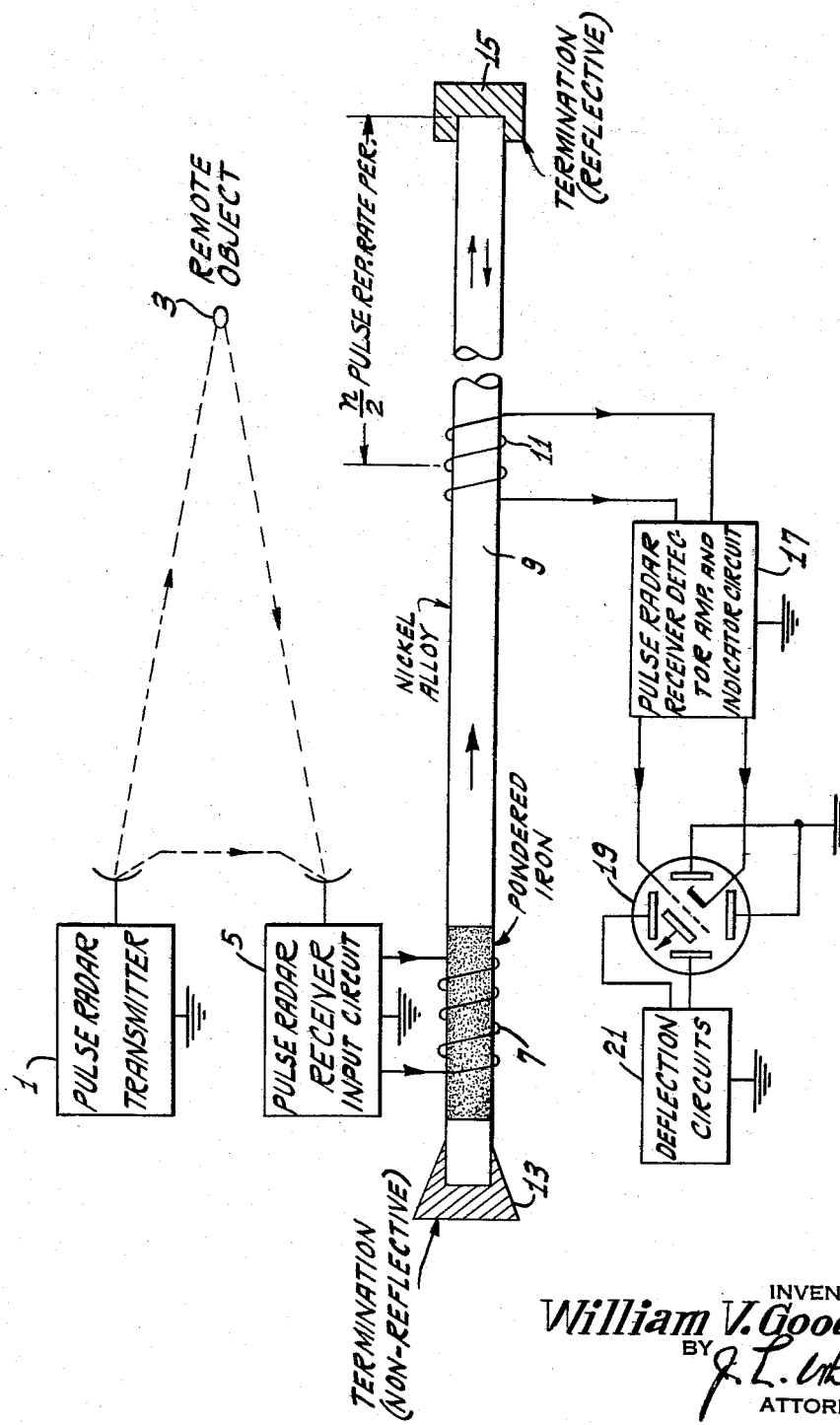

2,718,637

RADAR MOVING TARGET INDICATION SYSTEM

William V. Goodwin, Haddonfield, N. J., assignor to Radio Corporation of America, a corporation of Delaware Application July 27, 1951, Serial No. 238,853

4 Claims. (Cl. 343—7.7)

This invention relates generally to radar moving target indication systems and more particularly to a magnetostrictive delay line for eliminating stationary radar target echo signals.

Conventional moving target indication (MTI) systems for pulse radar systems employ either mercury delay lines or storage tubes for distinguishing between indications of stationary and moving radar targets. The purpose of such moving target indication systems is to eliminate the indications caused by stationary radar targets which would tend to obscure the indications of less prominent moving targets.

Heretofore, in line-by-line moving target indications systems, a relatively expensive and unwieldly mercury delay line has been employed for the cancellation of the stationary target indications. The delay line functions to store all of the echo pulses received from each radiated transmitted radar pulse so that they may be compared with the echoes received from a subsequent radar transmitter pulse. The accuracy with which the stored and subsequent pulses may be compared determines the degree to which echoes from fixed targets may be cancelled. Distortion of the echo wave trains on the delay line due to the limited frequency characteristic of the driving and pickup elements limits the degree of cancellation of pulses corresponding to the fixed echoes.

In conventional area moving target indications systems, and in some of the more recent line-by-line and area MTI systems, storage tubes have been employed for comparing and cancelling the indications of pulses received from fixed schoes. Such storage tubes are complex and expensive and require complex associated circuitry.

The instant invention comprises a magnetostrictive delay line for use with a radar moving target indication system in which cancellation of stationary target signals is accomplished by utilizing a single pickup coil in conjunction with a selected type delay line termination. In addition to the feature of utilizing a single pick-up coil for stationary target signal cancellation, a further advantage is afforded wherein the cooperative action of said pick-up coil and said termination effectively decreases the physical length of delay line required for a given time delay.

An object of the present invention is to provide improved means for distinguishing between fixed and moving target radar echo pulses.

Another object of the invention is to provide an improved delay line for use with a radar moving target indication system.

Another object of the invention is to provide improved means for distinguishing between fixed and moving target radar echo pulses by distinguishing between said pulses within a delay medium rather than by external means.

A further object is to provide an improved delay line for use with a radar moving target indication system, the axial length of which line is less, for a given time delay, than the lengths of previous similar delay lines.

A still further object is to provide a relatively simple and inexpensive magnetostrictive delay line.

The invention will be described in greater detail with reference to the accompanying drawing in which the single figure is a block schematic diagram of a pulse radar moving target indication system employing a novel delay line, according to the invention.

Referring to the drawing and according to a typical embodiment of the invention, a pulse radar transmitter 1 radiates repetitive pulses of radio frequency energy which are reflected from remote stationary and moving targets, for example a given remote object 3, to the input circuits 5 of a pulse radar receiver. After suitable radio frequency amplification, the received pulses are applied to the driver coil 7 of a magnetostrictive delay line 9. The portion of the delay line 9 which is contained under the driver coil preferably comprises a magnetostrictive ferrite material such as powdered iron. A suitable material for the remainder of the delay line is Ni-Span-C which is the tradename for a nickel alloy produced by the International Nickel Co.

Also disposed about the delay line 9, and separated from the driver coil 7 by a distance determined by the necessary shielding and physical size of the coils, a pick-up coil 11 is provided for receiving the delayed radar echo pulses.

The pulse input end of the delay line is terminated in a non-reflective or absorptive termination 13 while the pulse output end of the delay line is terminated in a reflective termination 15. The absorbent termination 13 preferably comprises four-inch strips of Audioid (a viscous solid synthetic substantially zero temperature coefficient material) wrapped about the end of the delay line 9. The pressure of the Audioid against the line 9 is gradually increased in the direction of the end of the delay line. Other well-known absorptive terminations, however, such as felt, or powdered tungsten in synthetic rubber also are suitable. The reflective termination 15 may consist of a large mass of metal, such as brass, welded or silver-soldered to the output end of the delay line 9. The material selected for this type termination should have a high reflection coefficient.

According to the invention, the separation between the pick-up coil 11 and the reflective termination 15 is chosen such that a given stationary target echo pulse train propagated toward the reflective termination is reflected thereby and arrives back at the pick-up coil 11 coincident with but in phase opposition to the next succeeding echo pulse train derived from said given target. Assuming that the delay line signal attenuation is negligible, this time separation may be an integral multiple $n$ (including one) of one-half the radar system pulse repetition rate period. It is apparent that there is a cancellation of stationary target signals if the successive pulse trains are identical. It also may be seen that the incident and reflected echo pulse trains travel through common portions of the delay line thus effectively decreasing the overall delay line length. In a like manner, the effective comparison of successive echo pulse trains obtained from moving targets produces a net instantaneous acoustic wave signal which is converted, by the pick-up coil 11, into a corresponding electrical pulse. The moving target echo pulses are then applied to the balance of the radar receiver 17 comprising detector, amplifier, and indicator circuits and to a radar indicator 19. Conventional deflection circuits 21 are connected to the indicator 19. In the example illustrated, the radar indicator is of the cathode ray type having electrostatic deflection elements and provides a plan position indication (P. P. I.) of moving radar targets. The invention is equally applicable to other types of pulse radar systems and indicator arrangements.

Modifications of the present invention will be apparent to those skilled in the art. It may be desirable, for example, to utilize an open type reflective termination rather than the rigid mechanical type above illustrated. The broad teaching of the invention is directed to the 180° phase reversal of the reflected acoustic wave for cancellation of subsequent acoustic waves produced by a given stationary object. It may be preferable to construct the delay line of separate joined portions of nickel and aluminum rather than utilizing powdered iron and Ni-Span-C as herein shown. Practice has shown, however, that the magnetostrictive ferrite, powdered iron, is relatively efficient for converting electrical energy into mechanical energy. The use of the same material (powdered iron) at the pick-up coil tends to distort the reflected acoustic wave and thus may prevent proper cancellation of stationary target signals. It is for this reason that the remainder of the delay line is chosen to be Ni-Span-C since it causes less pulse distortion and is a fairly efficient transmitting medium. It also has the further advantage of a substantially zero thermal elasticity coefficient. In the event that Ni-Span-C is not obtainable, hard drawn nickel also performs satisfactorily. The effect of delay line attenuation may be obviated by operating the pick-up coil in a non-linear region of the delay line magnetostrictive characteristic.

What is claimed is:

1. For use in a moving target indicating radar system which includes means for radiating successive radio-frequency pulses for reflection by remote stationary and moving objects and means for receiving said pulses after reflection by said objects: apparatus comprising a magnetostrictive delay line, an absorptive termination for one end of said line and a reflective termination for the other end of said line, an element coupled to the absorptively terminated end of said line for translating electrical pulses appearing at the output of said pulse receiving means into related mechanical pulsations of said delay line, a pickup element coupled to said delay line spaced from said coupling element and spaced a predetermined distance from said reflective termination for cancelling successive pulses reflected from stationary objects, and connection means to said pickup element for applying pulses detected thereby to indicator circuitry.

2. For use in a moving target indicating radar system which includes means for radiating successive radio-frequency pulses for reflection by remote stationary and moving objects and means for receiving said pulses after reflection by said objects: apparatus comprising a magnetostrictive delay line, an absorptive termination for one end of said line and a reflective termination for the other end of said line, a winding coupled to the absorptively terminated end of said line for translating electrical pulses appearing at the output of said pulse receiving means into related mechanical pulsations of said delay line, a pickup winding coupled to said delay line spaced from said coupling winding and spaced a predetermined distance from said reflective termination for cancelling successive pulses reflected from stationary objects, and connection means to said pickup winding for applying pulses detected thereby to indicator circuitry.

3. Apparatus as claimed in claim 1 wherein said pickup winding and said reflective termination are separated a distance corresponding to an integral multiple of one-half the wavelength of said successive pulses.

4. A moving target indicating radar system comprising, means for radiating successive radio-frequency pulses for reflection by remote stationary and moving objects, means for receiving said pulses after reflection by said objects, a magnetostrictive delay line, an absorptive termination for one end of said line and a reflective termination for the other end of said line, an element coupled to the absorptively terminated end of said line for translating electrical pulses appearing at the output of said pulse receiving means into related mechanical pulsations of said delay line, a pickup element coupled to said delay line spaced from said coupling element and spaced a predetermined distance from said reflective termination for cancelling successive pulses reflected from stationary objects, and means connected to said pickup element responsive to pulses indicated thereby for indicating the distances of said moving objects from said radiating means.

References Cited in the file of this patent

UNITED STATES PATENTS

| | | |
|---|---|---|
| 2,401,094 | Nicholson | May 28, 1946 |
| 2,491,450 | Holmes | Dec. 13, 1949 |
| 2,532,546 | Forbes | Dec. 5, 1950 |